US011658935B2

(12) United States Patent
Maslak

(10) Patent No.: US 11,658,935 B2
(45) Date of Patent: May 23, 2023

(54) SYSTEMS AND METHODS FOR CONTENT SERVER RENDEZVOUS IN A DUAL STACK PROTOCOL NETWORK

(71) Applicant: Level 3 Communications, LLC, Broomfield, CO (US)

(72) Inventor: Joelle T. Maslak, Golden, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

(21) Appl. No.: 17/075,289

(22) Filed: Oct. 20, 2020

(65) Prior Publication Data

US 2021/0036981 A1 Feb. 4, 2021

Related U.S. Application Data

(63) Continuation of application No. 15/440,393, filed on Feb. 23, 2017, now Pat. No. 10,819,673.

(60) Provisional application No. 62/298,577, filed on Feb. 23, 2016.

(51) Int. Cl.
| | | |
|---|---|---|
| G06F 15/16 | (2006.01) |
| H04L 61/4511 | (2022.01) |
| H04L 69/18 | (2022.01) |
| H04L 69/167 | (2022.01) |
| H04L 67/1001 | (2022.01) |
| H04L 101/69 | (2022.01) |

(52) U.S. Cl.
CPC ...... *H04L 61/4511* (2022.05); *H04L 67/1001* (2022.05); *H04L 69/167* (2013.01); *H04L 69/18* (2013.01); *H04L 2101/69* (2022.05)

(58) Field of Classification Search
CPC ............. H04L 61/1511; H04L 2101/69; H04L 67/1001; H04L 69/167; H04L 61/2542; H04L 69/18
USPC ........................................................ 709/245
See application file for complete search history.

(56) References Cited

U.S. PATENT DOCUMENTS

| | | | |
|---|---|---|---|
| 7,526,562 B1 | 4/2009 | Samprathi et al. | |
| 2003/0023618 A1* | 1/2003 | Orbits ................... | G06F 16/184 |
| 2004/0143579 A1* | 7/2004 | Nakazawa .......... | H04L 61/1511 |
| 2004/0162909 A1* | 8/2004 | Choe ................... | H04L 61/6086 |
| | | | 709/230 |

(Continued)

OTHER PUBLICATIONS

International Preliminary Report on Patentability, dated Aug. 28, 2018, Intl Appl. No. PCT/US17/019056, Intl Filing Date Feb. 23, 2017; 8 pgs.

(Continued)

*Primary Examiner* — Hamza N Algibhah

(57) ABSTRACT

Implementations described and claimed herein provide systems and methods for serving content over a network. In one implementation, a method of serving content is provided. The method includes maintaining a first address record associated with serving a resource and a second address record associated with serving the same resource. The first address record is further associated with a first protocol for a first device capable of serving the resource. Similarly, the second address record is associated with a second protocol, different from the first protocol, for a second device, distinct from the first device, capable of serving the resource. The method further includes providing, in response to at least one resolution request for the resource, the first address record and the second address record.

2 Claims, 3 Drawing Sheets

(56) References Cited

U.S. PATENT DOCUMENTS

| | | | |
|---|---|---|---|
| 2007/0050613 A1 | 3/2007 | Islam et al. | |
| 2011/0058553 A1* | 3/2011 | Brzozowski | H04L 29/12358 370/392 |
| 2011/0153831 A1 | 6/2011 | Mutnuru et al. | |
| 2011/0280241 A1 | 11/2011 | Field | |
| 2012/0198492 A1* | 8/2012 | Dhruv | H04N 21/23424 725/32 |
| 2013/0060965 A1* | 3/2013 | Peng | H04L 29/12971 709/245 |
| 2013/0103853 A1* | 4/2013 | Lyon | H04L 61/251 709/238 |
| 2013/0159472 A1 | 6/2013 | Newton et al. | |
| 2013/0191412 A1* | 7/2013 | Kitamura | H04L 61/1511 707/769 |
| 2013/0205035 A1* | 8/2013 | Chen | H04L 61/1511 709/230 |
| 2013/0212127 A1* | 8/2013 | Kitamura | H04L 61/251 707/770 |
| 2013/0212299 A1* | 8/2013 | Grundemann | H04L 61/2546 709/245 |
| 2013/0232278 A1* | 9/2013 | Zou | H04L 61/1511 709/245 |
| 2014/0324704 A1 | 10/2014 | Blankenbeckler | |
| 2015/0207775 A1* | 7/2015 | Zou | H04L 61/1511 709/221 |
| 2015/0358277 A1* | 12/2015 | Onishi | G06F 16/951 709/245 |
| 2015/0381752 A1* | 12/2015 | Torres | H04L 67/28 709/228 |
| 2016/0036943 A1* | 2/2016 | Kish | H04L 61/1511 709/203 |
| 2016/0149978 A1* | 5/2016 | Wissingh | H04N 21/8456 709/231 |
| 2016/0198202 A1* | 7/2016 | Van Brandenburg | H04N 21/4405 725/31 |
| 2016/0219023 A1* | 7/2016 | So | H04N 21/6125 |
| 2016/0234504 A1* | 8/2016 | Good | H04N 19/40 |
| 2016/0315987 A1* | 10/2016 | Yamagishi | H04N 21/8456 |
| 2016/0344688 A1* | 11/2016 | Lakhera | H04L 61/251 |
| 2016/0360265 A1* | 12/2016 | Flick | H04N 21/4334 |
| 2017/0187768 A1* | 6/2017 | Huang | H04L 67/2842 |
| 2017/0244667 A1 | 8/2017 | Maslak | |
| 2019/0104059 A1* | 4/2019 | Surcouf | H04L 45/50 |

OTHER PUBLICATIONS

International Search Report dated Jun. 6, 2017, In'tl Appl. No. PCT/US17/019056, Int'l Filing Date Feb. 23, 2017; 5 pgs.

Written Opinion of the International Searching Authority dated Jun. 6, 2017, In'tl Appl. No. PCT/US17/019056, Int'l Filing Date Feb. 23, 2017; 6 pgs.

* cited by examiner

SYSTEMS AND METHODS FOR CONTENT SERVER RENDEZVOUS IN A DUAL STACK PROTOCOL NETWORK

TECHNICAL FIELD

Aspects of the present disclosure involve content distribution, and more particularly involve optimizing content delivery from various possible content servers, which may be in a content distribution network.

BACKGROUND

Historically, Internet traffic has been routed across the Internet using the Internet Protocol version 4 (IPv4) protocol. IPv4 uses 32 bits to describe the address of a target device for routing packets of data to flow to that target device. As the Internet and the number of devices expanded, the inherent limit of 32 bits to provide sufficient unique addresses inspired the creation of the Internet Protocol version 6 (IPv6) protocol, which uses 128 bits for addressing and has been deployed in parallel with IPv6 since 2006. Nonetheless, a significant amount of Internet traffic and devices still use IPv4.

Given the ability to send and receive information using the two different protocols, many devices are configured to communicate using either protocol, commonly referred to as being "dual stacked". In many instances, however, communication over one protocol works better than communication over the other protocol. Such discrepancies may be due to a network or device being optimized or otherwise better developed for one protocol or the other. For example, during the initial release of IPv6, many networks included bugs and inefficiencies with respect to transporting IPv6 traffic. Thus, many conventional networks, including cable networks, are dual stacked to allow devices to communicate over IPv4 when doing so over IPv6 is unavailable or otherwise inefficient. In that regard, the "Happy Eyeballs" algorithm has been developed to provide an automatic way for devices to switch from IPv6 communication to IPv4 communication, or possibly vice-versa, when one protocol or the other works more effectively.

It is with these observations in mind, among others, that aspects of the present disclosure were conceived.

SUMMARY

Implementations described and claimed herein address the foregoing problems, among others, by providing systems and methods for obtaining and providing content in a dual stacked network environment. In one implementation, a method of serving content is provided. The method includes maintaining a first address record associated with serving a resource and a second address record associated with serving the same resource. The first address record is further associated with a first protocol for a first device capable of serving the resource. Similarly, the second address record is associated with a second protocol, different from the first protocol, for a second device, distinct from the first device, capable of serving the resource. The method further includes providing, in response to at least one resolution request for the resource, the first address record and the second address record.

In another implementation, a method of obtaining content is provided. The method includes obtaining, in response to a resolution request for a resource, a first network record and a second network record. The first network record is associated with a first protocol for a first device capable of serving the resource and the second network record is associated with a second protocol, distinct from the first protocol for a second device capable of serving the resource. The method further includes obtaining performance information pertaining to a performance of obtaining the resource from the first device and a performance of obtaining the resource from the second device. Based on the performance information, a request is made for the resource from the first device using the first protocol or the second device using the second protocol.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

BRIEF DESCRIPTION OF THE DRAWINGS

The foregoing and other objects, features, and advantages of the present disclosure set forth herein will be apparent from the following description of particular embodiments of those inventive concepts, as illustrated in the accompanying drawings. It should be noted that the drawings are not necessarily to scale; however the emphasis instead is being placed on illustrating the principles of the inventive concepts. Also, in the drawings the like reference characters may refer to the same parts or similar throughout the different views. It is intended that the embodiments and figures disclosed herein are to be considered illustrative rather than limiting.

DETAILED DESCRIPTION

Figure 1:
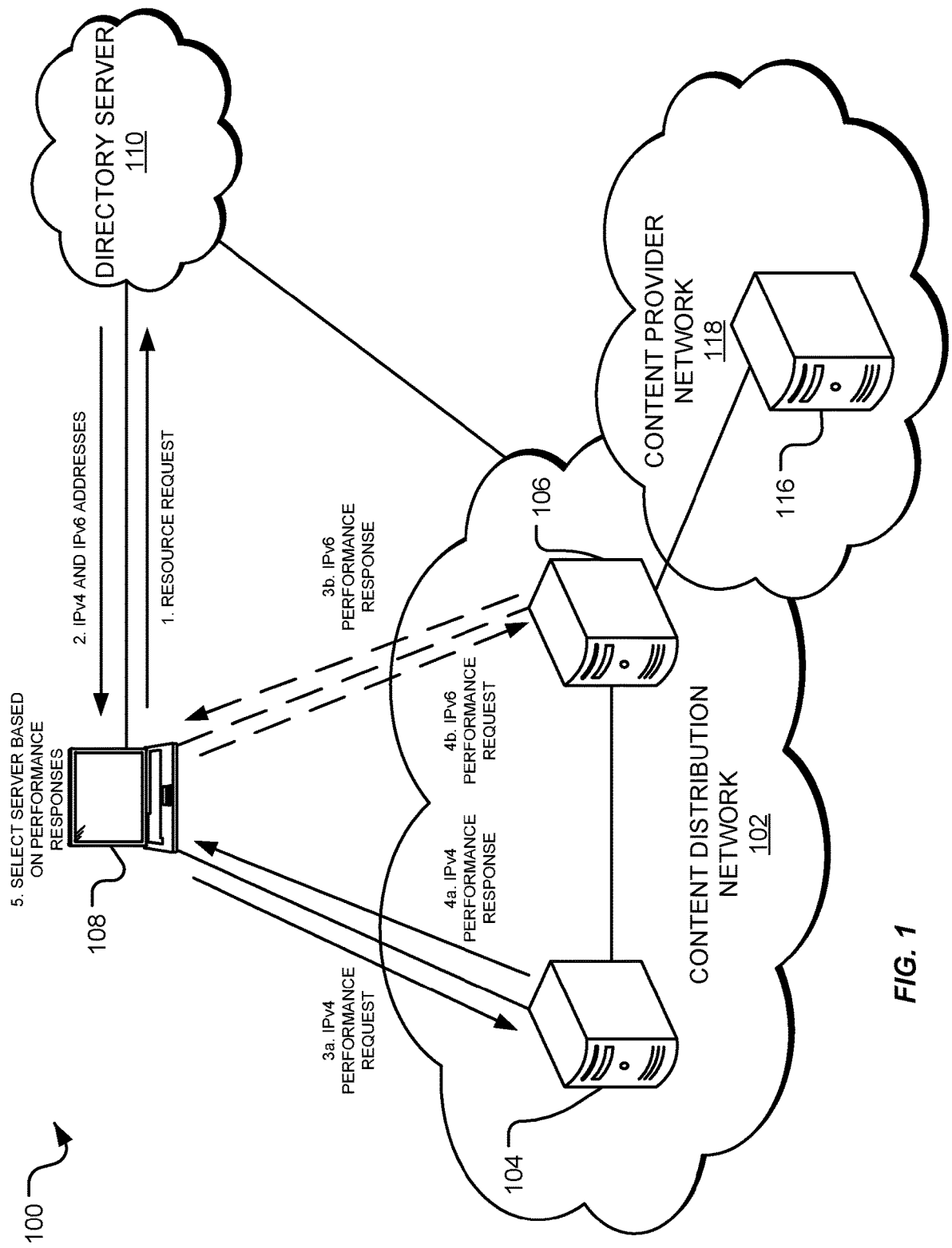
FIG. 1 shows an example system for obtaining and providing content.

Aspects of the present disclosure involve system and methods for obtaining and providing content over a network implementing at least two communications protocols, such as a dual stack network. In one implementation, a domain name system (DNS) is operatively coupled to a network including two or more devices configured to serve a resource using different protocols. In response to receiving a request for the resource from a client, the DNS provides address records corresponding to each of the devices. The client device then obtains and analyzes performance information pertaining to obtaining the resource from the devices using the different protocols. Based on the outcome of the analysis, the client device determines from which of the devices to request the resource.

In one embodiment, the DNS has records or access to records for obtaining resources from a Content Distribution Network (CDN) and the devices correspond to nodes of the CDN. Generally, a CDN is a distributed system of servers deployed across a network to serve content with high performance and availability to IP addresses associated with end users. Content, also referred to herein as "resources", served via a CDN may include web objects (e.g., text, graphics, or scripts), downloadable objects (e.g., media files, software, software patches, or documents), applications, streaming media (e.g., live or on-demand), and the like. Content providers, such as media companies or vendors, may contract with CDN operators to serve their content to their end users, and a CDN may utilize a primary network, such as a large Internet Service Provider (ISP) or backbone provider, or other carriers or networks to host its servers. In the present disclosure, the DNS stores and provides address records corresponding to at least a first device configured to serve a resource using a first protocol, such as IPv4, and a second device configured to serve the same resource using a second protocol, such as IPv6. When a client device (also referred to herein as a "client"), or more often a resolver associated with a client, contacts the DNS during the process of requesting content, the DNS provides each of the address records to the client and the client determines which of the protocols is more effective in providing the content and requests the content accordingly. For example, in certain embodiments, the client executes a Happy Eyeballs function to select between the network location associated with the IPv4 address and the IPv6 address.

In many instances, clients in disparate geographic areas share a common resolver. The resolver is generally charged with receiving requests from client devices for resources and interacting with the DNS to obtain a corresponding IP address for any requested resource. For example, clients in Boston and clients in New York may share a resolver. Often, the DNS is aware primarily of the resolver and has little or no additional information regarding the client devices behind the resolver, including the identities or locations of the client devices. CDNs, in contrast, are often configured, when possible, to deliver content from the most effective content devices for any particular client device requesting the content. Effectiveness in such situations may be based on cost, proximity (logical, geographical, or both), bandwidth, contract, load, and other factors. In a simple example, it may be more effective to serve content from a device in Boston to a Boston area client than from a device in New York, in part because the server is geographically closer to the client and therefore content packets may traverse the network more quickly as there is less distance to traverse, fewer hops to make, and other factors. If the DNS, however, is not aware that the requesting client is in Boston as opposed to New York, the ability to choose the more effective location for serving content is complicated. Accordingly, systems and methods according to the present disclosure rely on assigning an address corresponding to a first protocol, such as IPv4, to a first device (or set of devices) hosting a resource in a first location and an address corresponding to a second protocol, such as IPv6, to a second device (or set of devices) hosting the same resource in a second location. As a result, a function for determining the most effective protocol to communicate with a dual stack device, such as a Happy Eyeballs function, can be appropriated and retasked to identify the device to most effectively deliver the requested resource.

FIG. 1 is a simplified example network environment 100 for distributing content (also referred to herein as "network resources" or "resources") to one or more users. In the example shown, a CDN 102 includes a first CDN device 104 and a second CDN device 106. Although a CDN 102 is illustrated in FIG. 1, it should be appreciated that the embodiments of the present disclosure may be utilized in other network services. The first CDN device 104 and the second CDN device 106 include CDN content distribution servers, such as CDN edge servers. Each of the first CDN device 104 and the second CDN device 106 may be further communicatively coupled to a content origin server 116, within the CDN 102, in a content provider network 118 or otherwise, and configured to receive content from the content origin server 116 to populate the edge server's storage for effective content distribution.

The CDN 102 is communicably coupled to one or more client devices 108 and a directory server 110, such as a Doman Name System (DNS) server. The CDN 102 is capable of providing content to the client device 108, which is generally any form of computing device, such as a personal computer, mobile device, tablet (e.g., iPad), or the like. The client device 108 is configured to request, receive, process, and present content received from the CDN 102.

One or both of the first CDN device 104 and the second CDN device 106 may be edge servers, which may cache content or access cached content from another server, such as the content origin server 116 or other edge or mid-tier servers, to make it available in a more geographically or logically proximate location to the client device 108. Edge servers may reduce network loads, free capacity, lower delivery costs, and/or reduce content download time. The first CDN device 104 and the second CDN device 106 may be configured to provide requested content to a requestor, such as the client device 108, via an intermediate device. In one implementation, one or more of the first CDN device 104 and the second CDN device 106 provides the requested content from a respective local cache. The local cache is generally a storage system that stores content for delivery by one or more of the first CDN device 104 and the second CDN device 106. The local cache may be incorporated into one or more of the first CDN device 104, the second CDN device 106, and another CDN device within the CDN 102 or may be a storage device in communication with and accessible by one or more of the first CDN device 104, the second CDN device 106, and other CDN devices within the CDN 102. One or more of the first CDN device 104 and the second CDN device 106 retrieves the requested content from another source, such as a media access server (MAS) (e.g., a content distribution server or a content origin server of a content provider network). The content is then served to client device 108 in response to the requests.

Although the first CDN device 104 and the second CDN device 106 are shown as directly coupled to the client device 108, it should be appreciated that additional components may be, and in most cases are, disposed between the client device 108 and either of the first CDN device 104 and the second CDN device 106, including routers, switches, and other network elements as well as intermediate networks. In other words, the content requested and provided to the client device 108 may take many routes from the CDN 102 and its components depending on which content server is tasked with providing the content. Thus, although this particular disclosure utilizes the example of providing the content to the client device 108 directly over the CDN 102 from the first CDN device 104 or the second CDN device 106, any number of intermediate devices, networks, and connections to the CDN 102 may be utilized to receive the requested content. Further, although discussed in relation to the CDN 102, similar methods and techniques discussed herein apply to other telecommunications networks, such as a network providing IP-related services to the client device 108.

In one implementation, the client device 108 includes an Internet browser application or other suitable application with which a link (e.g., a hyperlink) or form of content pointer to a resource or content item may be selected, entered, or otherwise invoked, causing a request to be sent from the client device 108 to the directory server 110. For example, a user may wish to stream a movie on a computer or any other number of possible user devices, as described herein. To start the movie, a link to the movie in a website or other interface may be selected or otherwise activated. In some instances, the user may select a displayed graphic of the movie, and that graphic is operably associated with the link that begins the process of obtaining the movie data from the CDN 102. Selection of the link in some form causes a request to be sent to the directory server 110 providing a DNS service in the CDN 102. As described below in more detail, the directory server 110 responds to the request by providing multiple network addresses (e.g., an IPv4 address and an IPv6 address) where the resource associated with the selected link can be obtained. In one implementation, the directory server 110 provides a DNS service, which resolves an alphanumeric domain name to the IP addresses. More specifically, the directory server 110 resolves the link name (e.g., URL or other identifier) to an associated network address from which the client device 108 can retrieve the requested resource.

The network environment 100 is generally configured to facilitate communication of data using multiple communication protocols. Components of the CDN 102 are further configured to communicate using one or more of the multiple protocols supported by the network environment 100. For example, in the embodiment of FIG. 1, the network environment 100 is a dual stack network configured to communicate using each of Internet Protocol version 4 (IPv4) and Internet Protocol version 4 (IPv6) and the first CDN device 104 and the second CDN device 106 are configured to provide the same content to the client device 108 using IPv4 and IPv6, respectively. For simplicity, the following discussion regarding the operation of the network environment 100 refers to communication using IPv4 and IPv6 as only an example. In other embodiments, alternative communication protocols may be used.

During operation, the client device 108 submits a resolution request to the directory server 110 for a resource available over the CDN 102 and, more specifically, for a resource available from each of the first CDN device 104 and the second CDN device 106. In response, the directory server 110 returns an IPv4 address corresponding to the first CDN device 104 and an IPv6 address corresponding to the second CDN device 106. The returned addresses may be based on a single resolution request received from the client device 108 or may be based on separate requests. For example, the directory server 110 may automatically return an AAAA record (for an IPv6 address) for records with both addresses even though the client device 108 requested only an A record (for an IPv4 address).

In response to receiving the addresses from the directory server 110, the client device 108 tests the IPv4 and IPv6 addresses to ascertain responsiveness. For example, in certain embodiments, the client device 108 is configured to execute a Happy Eyeballs function that pings or otherwise tests the IPv4 address and the IPv6 address. Conventionally, Happy Eyeballs determines whether the network performance to obtain content from a given dual stack device is preferable under one of IPv4 or IPv6. In a fully deployed and functioning network, round trip time for both protocols should be roughly the same as the two addresses each point to the same device and would traverse a similar path albeit under different protocols. However, in embodiments of the present disclosure, devices for providing the requested content over different protocols are purposefully in different locations. Accordingly, the Happy Eyeballs function, or a similar performance test, is leveraged to instead ascertain or rendezvous a request with the device and underlying network more suitable to serving the request as opposed to testing the efficacy of the alternative protocols. For example, the first CDN device 104, which communicates using IPv4, may be in a first location, such as Boston, while the second CDN device 106, which communicates using IPv6 may be in a second location, such as New York. The initial performance test will therefore assess the performance of the first CDN device 104 and the second CDN device 106, along the with respective network performance between the devices and the requesting device, to assess the more effective location from which to serve the request. If the network performance and machine performance in both scenarios is roughly equivalent, then the nearer server will provide the content more effectively simply due to proximity. For example, if the client device 108 is located in the Boston area, the client device 108 will select the IPv4 address and request the content from the Boston based machine, i.e., the first CDN device 104.

In certain embodiments, the performance test defaults to preferring one protocol over another. For example, if the performance test produces results for different protocols that are substantially equal or within a particular threshold, the client device 108 may default to requesting content using a particular protocol. For example, IPv6 may be preferred if the round trip time over each of IPv6 and IPv4 is substantially the same or within a predetermined margin. For example, if the round trip time between IPv4 and IPv6 differs by less than a predetermined percentage (e.g., 5%, 10%, 15%) or a predetermined period of time (e.g., 50 milliseconds, 100 milliseconds, 200 milliseconds), IPv6 may be automatically selected. Alternatively, default functionality that may be included in a performance test implemented by the client device 108, such as Happy Eyeballs, may be disregarded or overwritten. For example, if the round trip time to an IPv4 machine is less than IPv6 but within the threshold that would conventionally select IPv6 using a conventional Happy Eyeballs functions, client device 108 may instead select the IPv4 device.

In certain embodiments, the directory server 110 may receive details regarding the client device 108 and may return particular address records based on the information. For example, in the case of a CDN, the directory server 110 may be a CDN name server configured to return A and AAAA records for various requests based on characteristics of the requesting client, when known, including a location of the client. In alternative embodiments, the directory server 110 may not receive or otherwise have access to specific information regarding the client device 108, but may receive information corresponding to an intermediate device through which a resource request from the client device 108 is communicated. For example, the identity of an internet service provider (ISP) deploying a resolver of the directory server 110, the location of the resolver, general information about the geography of a group of clients using the resolver, and other information may be known. For example, a customer of the CDN may have a resolver in New York that serves clients in New York and Boston, and may also have a resolver in San Diego that serves Southern California customers. The directory server 110 may thus have a first pair of records (Boston and New York) to return for a request originating from the New York resolver, and may return one or more alternative records for a request form the San Diego resolver. For example, in one embodiment, the CDN 102 includes CDN servers or devices in the Los Angeles metropolitan area and the San Diego. Accordingly, when the directory server 110 receives a resolution request originating from the San Diego resolver (as opposed to the New York resolver), the directory server 110 returns an A record corresponding to the Los Angeles CDN device and an AAAA record for the San Diego CDN device.

The methodology set out herein is not limited to optimizing content delivery based on location, but may further take into account broader network performance, alone or in combination. For example, while Boston servers may be closer to Boston clients, New York servers and the network pathway between the New York servers may be more effective (e.g., faster) in delivering content during periods when, for example, the Boston network is congested or Boston servers are malfunctioning or overloaded. Congestion may be based on various metrics including, without limitation, network latency and network throughput. In such situations, the New York servers may be chosen over the Boston servers due to the increased performance of the New York severs. Accordingly, while useful in selecting between CDN devices in different locations and across different portions of a network to serve content, the methodology may also be used in the context of selecting between CDN devices more geographically proximate, (e.g., housed within the same data center), for the purpose of discriminating between CDN devices based on factors including, without limitation, congestion, capacity, infrastructure deployment, logical network arrangement, and connections to other networks.

The client device 108 typically executes a performance test and selects among CDN devices hosting a requested resource at the initiation of a communication session. As a result, the selected CDN device is generally the best device at the time of initiating the communication session. However, during the course of a session, events may occur such that the chosen CDN device is no longer able to provide the requested resource efficiently or at all. For example, the chosen CDN device may fail, the connection between the client device 108 and the chosen CDN device may be interrupted, or network congestion may significantly increase. When such events occur in certain implementations, the client device 108 automatically switches to a different CDN device for which an address record was received. In alternative implementations, the client device 108 automatically executes a second performance test and selects a new CDN device based on the results of the second performance test. In either implementation, a new session is initiated between the client device 108 and the new CDN device to deliver the requested resource.

In certain implementations, the client device 108 may be a smart client that includes a browser or similar application that downloads a resource, such as a video, in discrete chunks. On failure of a connection to the resource, the client 108 may re-open the connection to the resource by reapplying the Happy Eyeballs algorithm or a similar performance algorithm. In other words, instead of relying on a fallback resource from which to obtain chunks of the resource, the client device 108 could rely on browser behavior to resume a failed or interrupted connection.

The client 108 may obtain a resource in accordance with a manifest file. A manifest file generally refers to a file including metadata for a set of associated resources. The set of associated resources may correspond to a set of files or may correspond to portions of a larger coherent resource. For example, a manifest file may include metadata corresponding to discrete portions, such as chunks, of a large video file or a streaming video feed. In the context of content distribution, manifest files generally include an identifier, such as a hostname, uniform resource locator (URL) (or uniform resource indicator URI), for each resource identified in the manifest file. Accordingly, a client device may access the manifest file and request each resource, based on the identifier, in the order specified in the manifest file. Referring again to the notion of the failure of a connection or session, the client may reference a manifest to request the next chunk of information, and thereby maintain play or a stream of the content with little or no disruption.

In implementations according to the present disclosure, the system may generate a manifest file that includes identifiers to multiple resources, but where the resource is available from different network addresses. For each of the multiple resources, the manifest file also includes a hostname or similar identifier. For example, the manifest file may divide a video into 200 discrete resources and associate a first hostname or similar identifier to the first 100 resources and a second hostname or identifier to the second 100 resources. During operation, the client device 108 resolves requests for the resources according to the manifest. However, to improve performance, the client device may execute a Happy Eyeballs algorithm, rendezvous or other performance algorithm when a change in hostname occurs. Accordingly, whenever the manifest changes between hostnames, the client device 108 reevaluates potential sources for the associated resource and determines which of the potential sources would most effectively provide the associated resource. By doing so, the client device 108 may dynamically adapt to changing network conditions, and request and obtain the resource or resources from the optimal network device. The use of two host names, each providing an equal number of resources is merely an example of one implementation of the manifest file. In other implementations, any distribution of the resources, including uneven distributions, among any suitable number of hostnames or identifiers may be used.

In certain implementations, the client device 108 may generate and/or store the manifest file locally. Alternatively, one or more computing devices of the CDN, such as an edge server, or in communication with the CDN, such as an origin server, may generate and/or host the manifest file and make the manifest file accessible to the client device 108 upon request of the corresponding resource. Manifest files may be static, such as when the manifest file is for a video-on-demand resource, or may be dynamically updated such as when the manifest file corresponds to a live video stream. In implementations in which a dynamic manifest file is used, the client device 108 may periodically request an updated manifest file from the host computing device.

The following example further illustrates the implementation of a manifest file as described above. During operation, the client device 108 obtains a manifest file corresponding to a set of associated resources. For example, a request for the set of associated resources from the client device 108 may be sent to a computing device of the CDN 102 that hosts the manifest file. In response, the computing device of the CDN 102 transmits or otherwise makes the manifest file accessible to the client device 108. The client device 108 may then proceed to submit a resolution request for the first resource of the set of associated resources as listed in the manifest file. In response, the client device 108 is provided with alternative network records for obtaining the resource. The client device 108 may then conduct a performance test to select the network address from which the client device 108 will request the resource, connect with the selected network address, and obtain the resource. The client device 108 may maintain the connection with the selected network address to obtain any subsequent resources included in the manifest file associated with the same hostname or identifier. However, when the client device 108 reaches a second resource in the manifest file that has a different hostname or identifier, the client device 108 may conduct a second performance test to select a second network address from which the client device 108 will request the second resource, connect with the selected second network address, and obtain the second resource.

Figure 2:
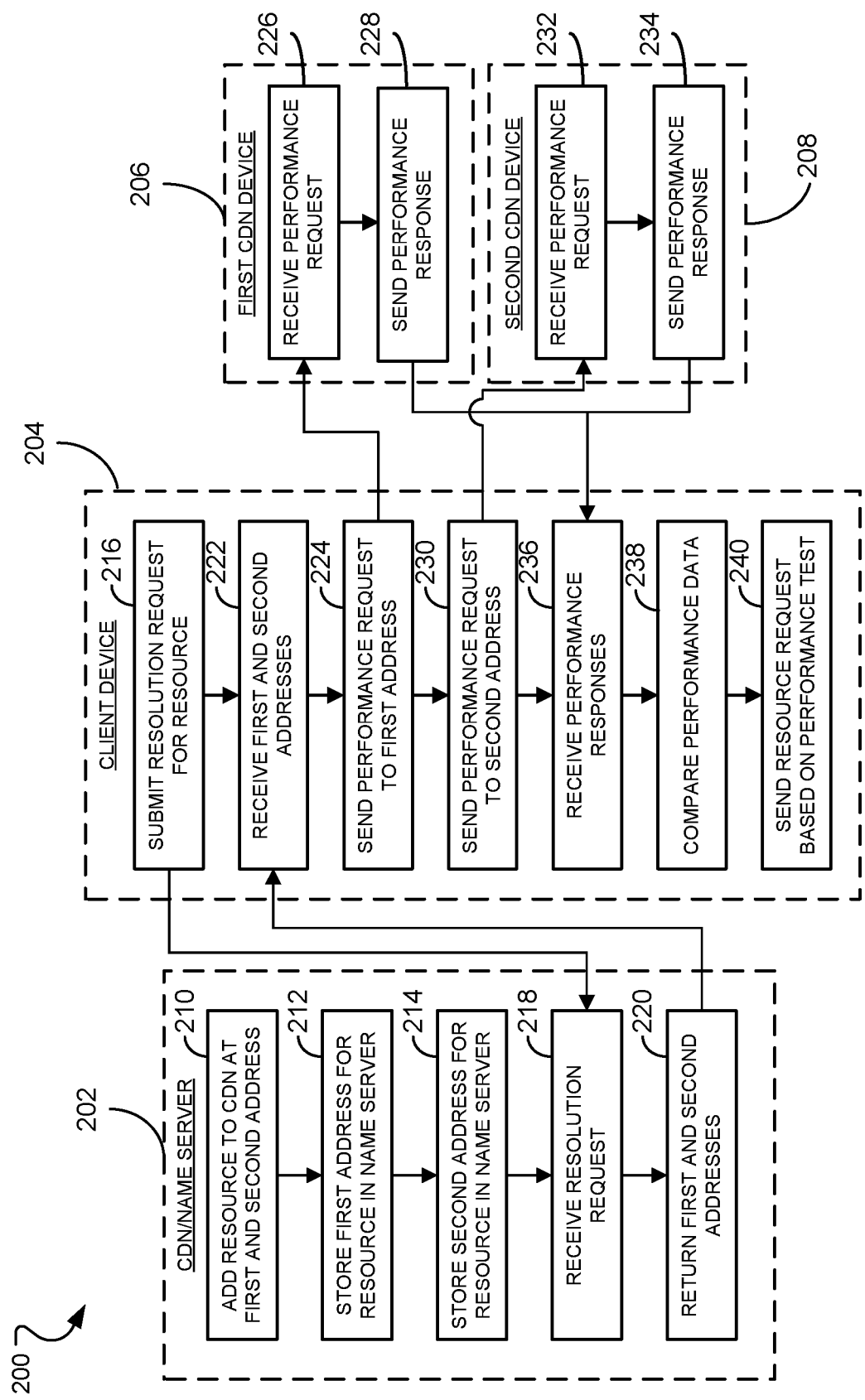
FIG. 2 is a flowchart of a method, or combination of methods, for obtaining and using records (e.g., A and AAAA records for IPv4 and IPv6) to assess the performance of obtaining content from different devices associated with each record, and connecting with the optimally performing device to request a resource.
Figure 3:
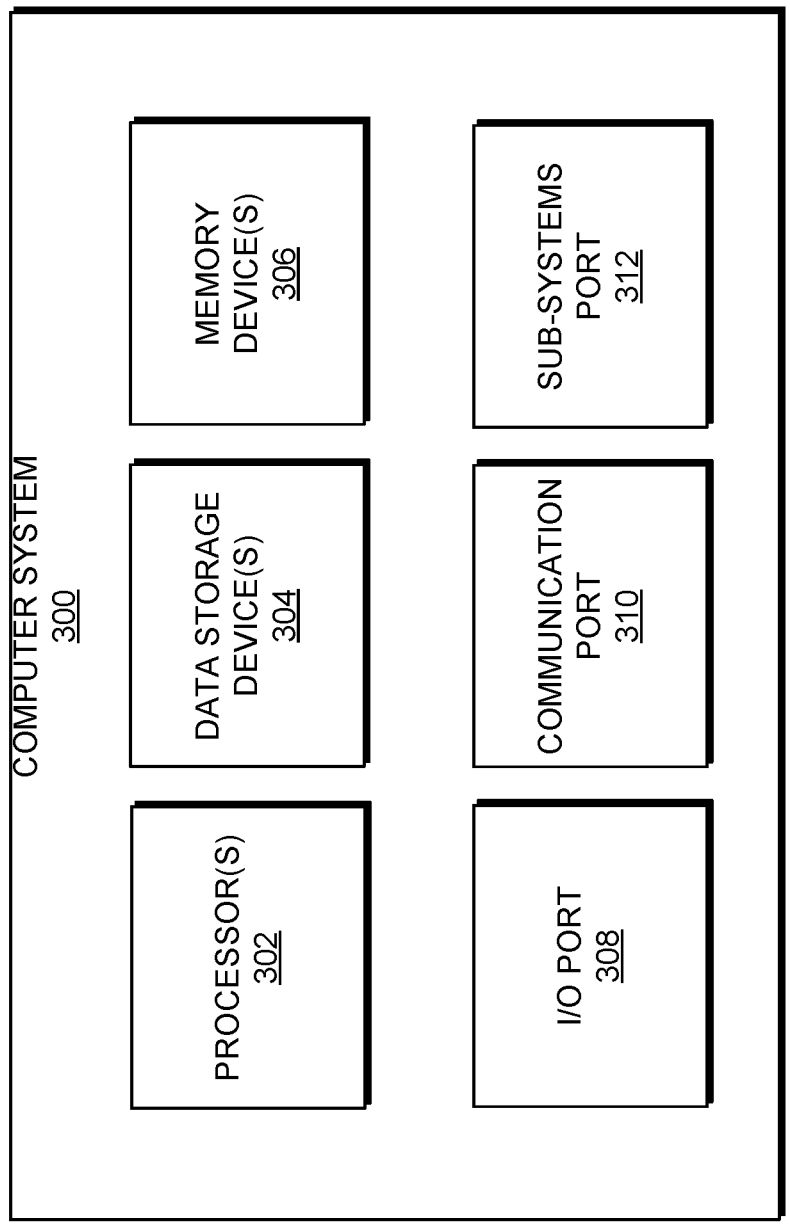
FIG. 3 is an example computing system that may implement various systems and methods of the presently disclosed technology.

FIG. 2 is a flowchart illustrating a method 200, or combination of methods, including various operations that may be performed by one or more computing systems, such as shown in FIG. 3. In particular, FIG. 2 illustrates a combination of methods for serving content in a dual stack protocol network. With reference to FIG. 1, the method 200 is illustrated as being divided based on functions performed by devices within the network. More specifically, box 202 includes functions and processes pertaining to a name server and corresponding CDN, such as the directory server 110 and the CDN 102 shown in FIG. 1. Box 204 corresponds to functions and processes pertaining to a client device, such as the client device 108 of FIG. 1. Finally, boxes 206 and 208 correspond to functions and processes pertaining to systems included in the CDN 102, such as the first CDN device 104 and the second CDN device 106 of FIG. 1.

Referring first to box 202, a resource is added to the CDN 102 and, more specifically, to multiple addresses within the CDN 102 (operation 210), such as a first address corresponding to the first CDN device 104 and a second address corresponding to the second CDN device 106. In response to a new resource being added to the CDN 102, records corresponding to the first address (operation 212) and the second address (operation 214) are each stored within the name/directory server 110. In certain implementations, the records may be pushed out to DNS infrastructure, which may include CDN name servers as well as other name servers. As previously discussed herein, the first address and the second address can correspond to devices having differences in one or more of physical location, logical location, communication protocol (e.g., IPv4 versus IPv6), and other characteristics.

Referring now to box 204, corresponding to the client device 108, a resolution request for the resource is submitted by the client device 108 to the name/directory server 110 (operation 216). In certain implementations, the resolution request from the client device 108 is processed with a resolver, which communicates with the name/directory server 110, which may involve more than one server, to resolve the resource request. The request is received by the name/directory server 110 (operation 281) and the corresponding first and second addresses are returned by the name/directory server 110 to the client device 108 (operation 220). In some instances, the name/directory server 110 returns one or more Virtual Internet Protocol (VIP) addresses. In such cases the first CDN device 104 may correspond to multiple machines associated with the first address and the second CDN device 106 may correspond to multiple machines associated with the same second address.

Upon receiving the first and second addresses (operation 222), the client device 108 obtains performance data corresponding to the first and second addresses. In the embodiment illustrated in method 200, the client device 108 sends a performance request to the first address (operation 224) and to the second address (operation 230). In general, the performance request corresponds to a message or data that can be used to assess performance of a CDN device from which the requested resource may be retrieved, including performance of the intervening network as measured using network latency, congestion, or any similar network performance metric.

For example, in the embodiment of FIG. 2 and as discussed below, performance may be assessed using a "pinging" or similar operation in which network performance is based on round-trip time for a performance request sent to each of the first CDN device 104 and the second CDN device 106. In a pinging operation, a utility of the requesting device, such as client device 108, generates an echo request packet, such as an Internet Control Message Protocol (ICMP) Echo Request, and transmits the echo request packet to a target host. After transmitting the echo request, the requesting device waits for a corresponding echo reply packet, such as an ICMP Echo reply packet, and calculates the elapsed time between transmitting the echo request packet and receiving the echo reply packet. The resulting time corresponds to a round-trip time for data to travel between the requesting device and the target host, thereby providing an indication of network performance and connectivity between the two devices. Multiple requests may be executed and one or more of the best, worst, average, and standard deviation round-trip time may be used in evaluating network performance. To gain further insight into the network performance additional parameters including, without limitation, the payload size, request frequency, and limits on the number of network hops that the request may make can also be limited.

In an alternative embodiment, the performance test is performed by sending a connection request to each of the first CDN device 104 and the second CDN device 106 using IPv4 and IPv6 protocols, respectively. The connect requests may be sent to each device simultaneously or may be first sent to the device corresponding to the device corresponding to a preferred protocol. In either case, the device to respond first is then used to carry out the request while any subsequent responses received from the other device are discarded.

In light of the foregoing and with reference to boxes 206 and 208 (corresponding to the first CDN device 104 and the second CDN device 106, respectively), the first CDN device 104 and the second CDN device 106 receive performance request messages, such as ICMP Echo Requests, from the client device 108 (operations 226 and 232). In response, the first CDN device 104 and the second CDN device 106 generate performance response messages, such as ICMP Echo Replies, and transmit the response messages back to the client device 108 (operations 228 and 234). In alternative embodiments, the performance test conducted by the client device 108 may be based on an exchange of connection requests and responses. More particularly, the performance request messages sent by the client device 108 to each of the first CDN device 104 and the second CDN device 106 may be connection requests. In response, to receiving the connection request, the first CDN device 104 and the second CDN device 106 provide performance responses in the form of connection request responses.

Upon receiving the performance response messages (operation 236), the client device 108 compares performance data corresponding to the performance requests (operation 238) and sends a resource request to one of the first CDN device 104 and the second CDN device 106 based on the outcome of the performance data comparison (operation 240). For example, in implementations in which a pinging approach is used, the client device 108 may compare round trip times associated with each request sent to the first CDN device 104 and the second CDN device 106. In other implementations in which a connection request approach is used, the client device 108 may compare the performance data simply by determining a first-received connection response message. The client device 108 may then discard any subsequently received response messages.

Referring to FIG. 3, a detailed description of an example computing system 300 having one or more computing units that may implement various systems and methods discussed herein is provided. It will be appreciated that specific implementations of these devices may be of differing possible specific computing architectures not all of which are specifically discussed herein but will be understood by those of ordinary skill in the art.

The computer system 300 may be a computing system capable of executing a computer program product to execute a computer process. Data and program files may be input to the computer system 300, which reads the files and executes the programs therein. Some of the elements of the computer system 300 are shown in FIG. 3, including one or more hardware processors 302, one or more data storage devices 304, one or more memory devices 308, and/or one or more ports 308-312. Additionally, other elements that will be recognized by those skilled in the art may be included in the computing system 300 but are not explicitly depicted in FIG. 3 or discussed further herein. Various elements of the computer system 300 may communicate with one another by way of one or more communication buses, point-to-point communication paths, or other communication means not explicitly depicted in FIG. 3.

The processor 302 may include, for example, a central processing unit (CPU), a microprocessor, a microcontroller, a digital signal processor (DSP), and/or one or more internal levels of cache. There may be one or more processors 302, such that the processor 302 comprises a single central-processing unit, or a plurality of processing units capable of executing instructions and performing operations in parallel with each other, commonly referred to as a parallel processing environment.

The computer system 300 may be a conventional computer, a distributed computer, or any other type of computer, such as one or more external computers made available via a cloud computing architecture. The presently described technology is optionally implemented in software stored on the data stored device(s) 304, stored on the memory device(s) 306, and/or communicated via one or more of the ports 308-312, thereby transforming the computer system 300 in FIG. 3 to a special purpose machine for implementing the operations described herein. Examples of the computer system 300 include personal computers, terminals, workstations, mobile phones, tablets, laptops, personal computers, multimedia consoles, gaming consoles, set top boxes, and the like.

The one or more data storage devices 304 may include any non-volatile data storage device capable of storing data generated or employed within the computing system 300, such as computer executable instructions for performing a computer process, which may include instructions of both application programs and an operating system (OS) that manages the various components of the computing system 300. The data storage devices 304 may include, without limitation, magnetic disk drives, optical disk drives, solid state drives (SSDs), flash drives, and the like. The data storage devices 304 may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 306 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in the data storage devices 304 and/or the memory devices 306, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

In some implementations, the computer system 300 includes one or more ports, such as an input/output (I/O) port 308, a communication port 310, and a sub-systems port 312, for communicating with other computing, network, or vehicle devices. It will be appreciated that the ports 308-312 may be combined or separate and that more or fewer ports may be included in the computer system 300.

The I/O port 308 may be connected to an I/O device, or other device, by which information is input to or output from the computing system 300. Such I/O devices may include, without limitation, one or more input devices, output devices, and/or environment transducer devices.

In one implementation, the input devices convert a human-generated signal, such as, human voice, physical movement, physical touch or pressure, and/or the like, into electrical signals as input data into the computing system 300 via the I/O port 308. Similarly, the output devices may convert electrical signals received from computing system 300 via the I/O port 308 into signals that may be sensed as output by a human, such as sound, light, and/or touch. The input device may be an alphanumeric input device, including alphanumeric and other keys for communicating information and/or command selections to the processor 302 via the I/O port 308. The input device may be another type of user input device including, but not limited to: direction and selection control devices, such as a mouse, a trackball, cursor direction keys, a joystick, and/or a wheel; one or more sensors, such as a camera, a microphone, a positional sensor, an orientation sensor, a gravitational sensor, an inertial sensor, and/or an accelerometer; and/or a touch-sensitive display screen ("touchscreen"). The output devices may include, without limitation, a display, a touchscreen, a speaker, a tactile and/or haptic output device, and/or the like. In some implementations, the input device and the output device may be the same device, for example, in the case of a touchscreen.

The environment transducer devices convert one form of energy or signal into another for input into or output from the computing system 300 via the I/O port 308. For example, an electrical signal generated within the computing system 300 may be converted to another type of signal, and/or vice-versa. In one implementation, the environment transducer devices sense characteristics or aspects of an environment local to or remote from the computing device 300, such as, light, sound, temperature, pressure, magnetic field, electric field, chemical properties, physical movement, orientation, acceleration, gravity, and/or the like. Further, the environment transducer devices may generate signals to impose some effect on the environment either local to or remote from the example computing device 300, such as, physical movement of some object (e.g., a mechanical actuator), heating or cooling of a substance, adding a chemical substance, and/or the like.

In one implementation, a communication port 310 is connected to a network by way of which the computer system 300 may receive network data useful in executing the methods and systems set out herein as well as transmitting information and network configuration changes determined thereby. Stated differently, the communication port 310 connects the computer system 300 to one or more communication interface devices configured to transmit and/or receive information between the computing system 300 and other devices by way of one or more wired or wireless communication networks or connections. Examples of such networks or connections include, without limitation, Universal Serial Bus (USB), Ethernet, Wi-Fi, Bluetooth®, Near Field Communication (NFC), Long-Term Evolution (LTE), and so on. One or more such communication interface devices may be utilized via the communication port 310 to communicate one or more other machines, either directly over a point-to-point communication path, over a wide area network (WAN) (e.g., the Internet), over a local area network (LAN), over a cellular (e.g., third generation (3G) or fourth generation (4G)) network, or over another communication means. Further, the communication port 310 may communicate with an antenna for electromagnetic signal transmission and/or reception.

The computer system 300 may include a sub-systems port 312 for communicating with one or more systems related to a vehicle to control an operation of the vehicle and/or exchange information between the computer system 300 and one or more sub-systems of the vehicle. Examples of such sub-systems of a vehicle, include, without limitation, imaging systems, radar, lidar, motor controllers and systems, battery control, fuel cell or other energy storage systems or controls in the case of such vehicles with hybrid or electric motor systems, autonomous or semi-autonomous processors and controllers, steering systems, brake systems, light systems, navigation systems, environment controls, entertainment systems, and the like.

The system set forth in FIG. 2 is but one possible example of a computer system that may employ or be configured in accordance with aspects of the present disclosure. It will be appreciated that other non-transitory tangible computer-readable storage media storing computer-executable instructions for implementing the presently disclosed technology on a computing system may be utilized.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium, optical storage medium; magneto-optical storage medium, read only memory (ROM); random access memory (RAM); erasable programmable memory (e.g., EPROM and EEPROM); flash memory; or other types of medium suitable for storing electronic instructions.

While the present disclosure has been described with reference to various implementations, it will be understood that these implementations are illustrative and that the scope of the present disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended thereto.

What is claimed is:

1. A method of serving content comprising:
generating a manifest file including a first identifier associated with a first resource of a set of associated resources and a second identifier associated with a second resource of the set of associated resources, the first identifier different from the second identifier and the first resource associated with a first content object different from the second resource associated with a second content object;
providing the manifest file in response to a request for the set of associated resources;
receiving a first resolution request for the first resource, the resolution request including the first identifier;
resolving the first resolution request to a first device;
receiving a second resolution request for the second resource, the second resolution request including the second identifier;
resolving the second resolution request to a second device different from the first device;

maintaining a first address record associated with serving the first resource, the first address record associated with the first device;

maintaining a second address record associated with serving the first resource, the second address record associated with a third device capable of serving the first resource; and in response to the first resolution request, providing each of the first address record and the second address record.

2. The method of serving content of claim 1, wherein the first identifier includes a first hostname and the second identifier includes a second hostname different from the first hostname.

\* \* \* \* \*